(No Model.)　　　　　　　　　　　　　　　　　　　2 Sheets—Sheet 1.
G. B. BILLINGS.
COMBINED FERTILIZER DISTRIBUTER AND PLANTER.
No. 333,723.　　　　　　　　　　　Patented Jan. 5, 1886.
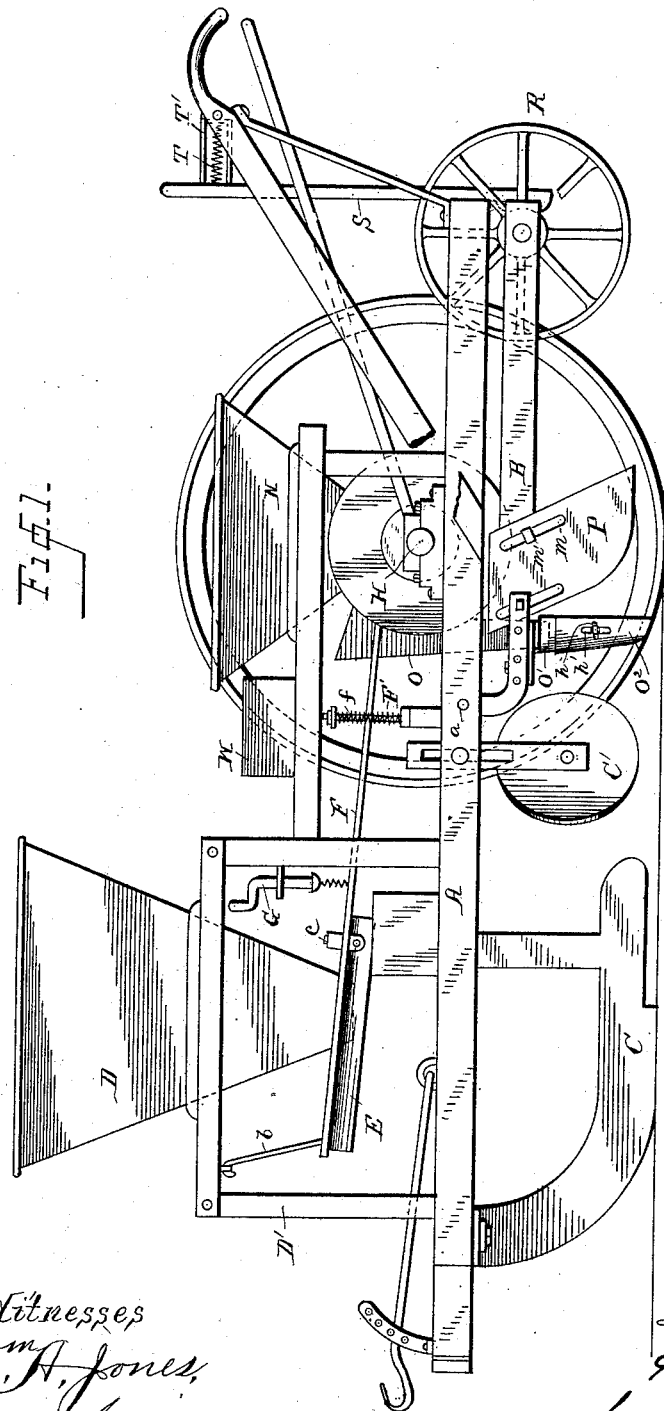
Witnesses
Wm. H. Jones,
A. H. Cragin
Inventor
George B. Billings.

(No Model.) 2 Sheets—Sheet 2.
G. B. BILLINGS.
COMBINED FERTILIZER DISTRIBUTER AND PLANTER.
No. 333,723. Patented Jan. 5, 1886.
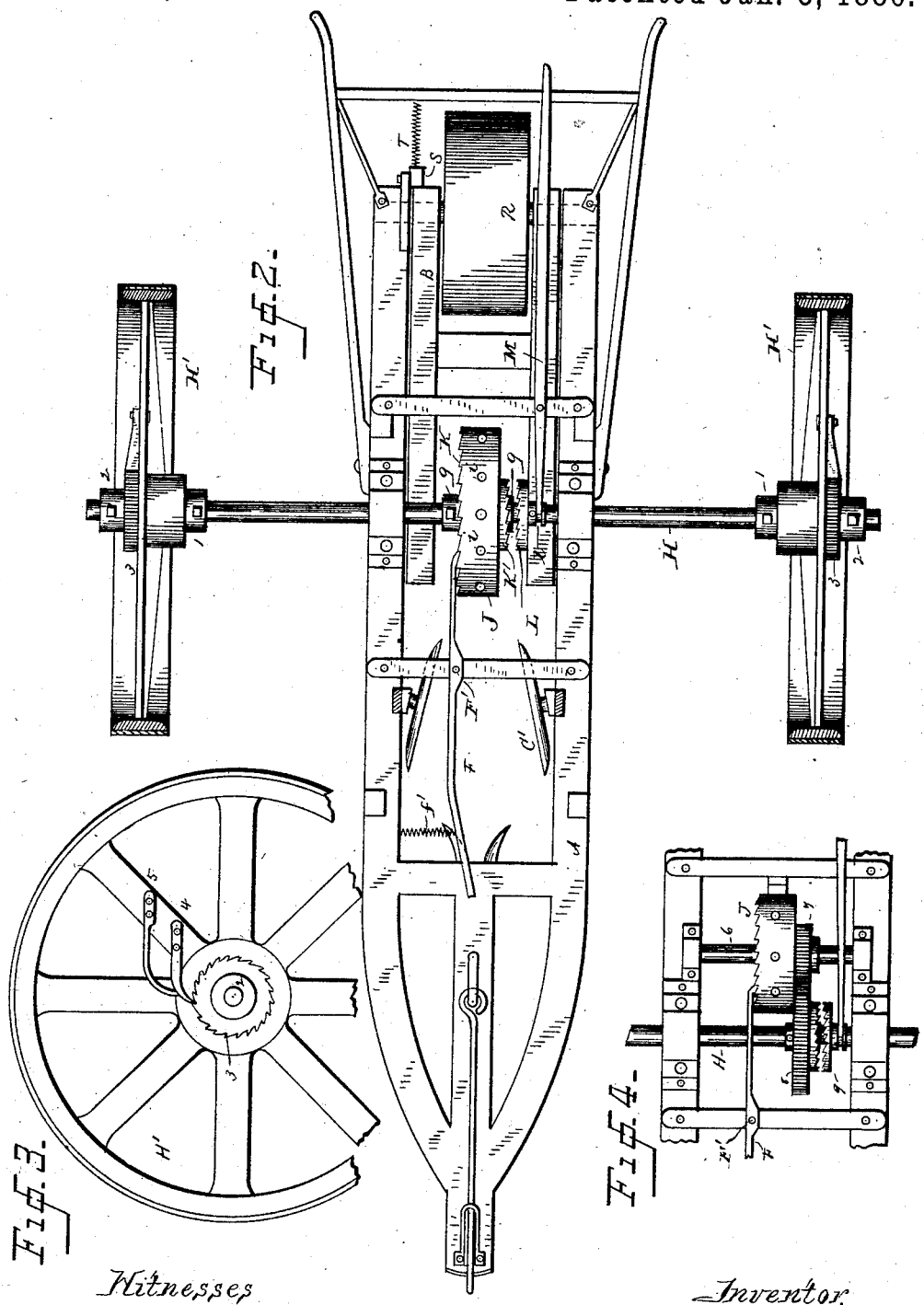
Witnesses
Wm H Jones
A. H. Cragin
Inventor
George B. Billings
by H W Cragin Atty

UNITED STATES PATENT OFFICE.

GEORGE B. BILLINGS, OF LEBANON, NEW HAMPSHIRE.

COMBINED FERTILIZER-DISTRIBUTER AND PLANTER.

SPECIFICATION forming part of Letters Patent No. 333,723, dated January 5, 1886.

Application filed July 11, 1885. Serial No. 171,358. (No model.)

*To all whom it may concern:*

Be it known that I, GEORGE B. BILLINGS, a citizen of the United States, residing at Lebanon, in the county of Grafton and State of New Hampshire, have invented certain new and useful Improvements in a Combined Fertilizer-Distributer and Planter; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a machine combining in one device the fertilizer-distributer, the seed-planting mechanism, and the roll.

My invention consists in improved means for adjusting and shaking the phosphate-pan; in arranging the wheels to act as row-markers and preventing them from revolving the main axle and seed-wheel when turning backward; in the arrangement of the seed-wheel on the main axle and the arrangement for throwing said wheel out of gear; in the combination, with the seed-spout and opener, of an adjustable share and scraper; in attaching the roll to a short frame pivoted to the main frame, the roll rising and falling with the short frame, held up or released by a notched lever kept in place by a spring; and, finally, in the combination of parts described below and pointed out in the claims.

In the drawings, Figure 1 is a side view of the machine, one of the driving-wheels being removed. Fig. 2 is a plan view, the hoppers and a portion of the wheels being removed. Fig. 3 is a broken detail view of the outside of one of the wheels. Fig. 4 is a plan view in broken section showing a modified arrangement of the seed-wheel.

Like letters refer to like parts.

A represents the main frame, and B the short one, below the former and pivoted to it at *a*.

C is a double-mold-board plow for turning a furrow both ways and opening the ground for the phosphate. C' are adjustable disks for covering the latter deep or shallow. The phosphate-hopper D rests in a suitable frame, D', and E is the pan hung forward by a link or links, *b*. From a bail, *c*, on the rear end of the pan, a shake-bar, F, extends back to ratchets on the seed-wheel. This bar is pivoted at F', being held down by a spiral spring, *f*, and the spring *f'* pulls back the shake-bar and gives the pan a lateral play as the seed-wheel actuates the said bar. (See Figs. 1 and 2.)

G is a crank-screw for raising and lowering the rear end of pan E, to regulate the amount of phosphate discharged.

H is the main axle, provided at either end with the wheels H'. On the inside of these are collars 1 1, fastened to the axle by set-screws.

2 and 3 are a combined collar and ratchet, the former being also fastened by a set-screw.

4 and 5 are a clutch and spring operating with ratchet 3. By the ratchet-and-clutch arrangement the wheels may be moved backward without turning the axle and seed-wheel, and by the use of collars 1 and 2 and their set-screws the wheels may be used as row-markers, and as follows: Loosen the set-screws, and slip the collars on the axle, being particular to set the wheels again equally distant from the side of the machine; or set the wheels apart the distance the rows are wanted from center to center of the wheels, and then bring up the collars and fasten the set-screws. The marking may then be done by keeping one of the wheels in its own track after turning at the end of the row.

J is the seed-wheel, turning loosely between two collars on axle H when out of gear, (see *g g*, Fig. 2,) and, considering the rate of motion which this wheel will receive from being on the axle H, it should be of larger diameter than when arranged as in Fig. 4. The periphery of wheel J is of ordinary construction, having a series of pockets, the seed-discharge from which is regulated by screws. (See *i i'*, Fig. 2.) On one side of said wheel is a ratchet-gear, K, for operating the shake-bar F, as above described, and on the other side is a smaller ratchet, K'. Matching with the latter is a ratchet-wheel, L, having lateral play on axle H by means of a spline. (Not shown.) The collar of this wheel has a circular groove, 2, for receiving the forked end of the shifting-lever M, pivoted to a cross-bar of the frame and extending well back. It will be seen by shifting the lever to the left that ratchet-wheels K' L will gear together, and axle H will operate to turn the seed-wheel, which in turn will drop seed and actuate bar F. By shifting the lever to the right ratchet-wheel L moves away from K', and seed-wheel J will not revolve with the axle H; therefore waste of seed or phosphate can be prevented when turning at the end of the row or when leaving the field.

The seed-hopper N rests over the seed-wheel and in front of the latter. The seed-spout O, fastened to the main frame, extends down within a seed-opener, O', attached to the roll-frame. This opener is triangular shaped and the lower portion of it is shod with a share, O², of like shape and adjustable up or down by means of set-screws passing through slots in the opener, (see $h\ h'$, Fig. 1,) and thus the seed may be planted deep or shallow.

P is the scraper for covering the seed and to adjust the depth of the earth over the seed. The scraper is slotted at $m$ and fastened to the frame B by bolts $m'$.

R is the roll, journaled in the frame B, and it is shown partly raised up.

S is a notched lever, and T is a spring between it and a round of the handles.

T' is a wire staple to keep the lever from being pulled too far back by the spring.

The operation of the lever is thus: Bear down the end of the handles, and as soon as the notched end of the lever passes by the end of frame B the spring will pull the lever back and hold the frame and roll off the ground until the lever is pushed forward, when the roll and its frame will drop back. When the roll is up, the machine turns easily, as it balances on the axle H.

W is an ordinary tool-box for obvious uses.

Fig. 4 shows a modification for operating the seed-wheel. It is there arranged on a short axle, 6, back of the axle H, and at one side is a cog-wheel, 7, gearing with a like wheel, 8, on axle H. Said wheel 8 has a collar on each side, and also gears with ratchet-disk 9, which operates just like the one before described, and the manner of operating the shake-bar is also the same. In this modification the diameter of the seed-wheel is smaller, as it has a more rapid rate of revolution; but the arrangement in Figs. 1 and 2 is preferred, as it saves in the cost of the construction of the machine and operates equally well. Besides, by placing the seed-wheel directly on the ground-wheel axle there is, in connection with the combined parts, a great gain in simplicity of construction and directness of operation.

Having fully described my invention, what I claim, and desire to secure by Letters Patent, is—

1. The combination, with the phosphate hopper and pan, of the shake-bar, the seed-wheel loosely mounted on the ground-wheel axle and operating said bar, and the said ground-wheel axle, adapted to be connected with or disconnected from the seed-wheel, as set forth.

2. The combination, with the phosphate hopper and pan, of the shake-bar, the crank-screw regulating the inclination of the pan, and the seed-wheel mounted on the driving-wheel axle, and adapted, substantially as shown, to operate said shake-bar, as set forth.

3. The combination, with the phosphate-hopper D and pan E, of the crank-screw G, lateral spring $f'$, the pivot F', and spring $f$, the seed-wheel J and its ratchet-gear K, and the axle H, adapted to rotate the seed-wheel, as set forth.

4. The combination, with the phosphate-hopper D, of the pan E, having link $b$ and bail $c$, the plow C, and the adjustable inclined disks C', the shake-bar F, the crank-screw G, the lateral spring $f'$, the pivot F, and spring $f$, the seed-wheel J, and its ratchet-gear K, and the axle H, adapted to rotate the seed-wheel, as set forth.

5. The combination, with axle H, having thereon the seed-wheel J, geared and ungeared, substantially as shown, of the driving-wheels H', having the clutch and spring 4 5, the united collar and ratchet-gear 2 3, and the set-screw collars 1 1, whereby the wheels H' may be turned backward without rotating axle H, and also be adjusted for row-marking, as set forth.

6. The combination, with the seed-hopper, the shake-bar, and phosphate-pan, of the seed-wheel J, loosely mounted on ground-wheel axle H, between collars $g\ g$, and having ratchet-gears K K', and the axle H, provided with a laterally-moving ratchet-disk, L, shifted by lever M, whereby the seed-wheel J may rotate with axle H to both drop seed and operate the phosphate-pan, or the said axle may rotate alone, as set forth.

7. The combination, with the seed-hopper N and wheel J, of the seed-spout O, attached to the main frame, the seed-opener O', attached to the roll-frame, pivoted to rise and fall below the main frame, the share O², adjustable vertically on the opener by the set-screws and slots $h\ h'$, the scraper P, adjustably attached to the roll-frame, and the roll R and its frame, as set forth.

8. The combination, with the main frame A, of the roll-frame B, pivoted to rise and fall below the former, the roll R, the notched lever S, the spiral spring T, extending between the lever and a round of the handles, and the wire-bail stop T', preventing the spring from pulling the lever too far back, as set forth.

In testimony whereof I affix my signature in presence of two witnesses.

GEORGE B. BILLINGS.

Witnesses:
EDWARD J. DURANT,
SOPHIA K. DURANT.